Sept. 28, 1965

T. S. GOLDEN ET AL 3,209,289

MICROWAVE TUNING DEVICE

Filed Dec. 26, 1962

INVENTORS,
THOMAS S. GOLDEN
PAUL E. SCHMID

BY *J. E. Hodges*

ATTORNEY 3,209,289
MICROWAVE TUNING DEVICE
Thomas S. Golden, Washington, D.C., and Paul E. Schmid, Jr., Vienna, Va., assignors, by mesne assignments, to the United States of America as represented by the Secretary of the Navy
Filed Dec. 26, 1962, Ser. No. 247,420
4 Claims. (Cl. 333—83)

This invention relates to means for tuning high frequency cavity resonators, and more particularly to arrangements for tuning such devices over a relatively wide frequency range at relatively high sweep frequency rates.

The resonant cavity has long been known in the microwave field as a means of producing the necessary high frequency resonant circuit required. These resonant cavities have found particular application whenever a low power, frequency controlled microwave source is required, such as produced by a reflex klystron. However, a continuing problem in the field of electronics has been the provision of a suitable method whereby the resonant frequency of these cavities may be controlled and varied over relatively wide ranges.

The frequency of a cavity may be controlled and changed by mechanical tuning which is accomplished by altering the physical dimensions of the cavity. However, there are severe limitations upon this method of mechanical tuning due to the relatively low speed at which the dimensions of the cavity may be changed. Also the resonant cavity, especially in its use with reflex and other klystrons, often forms a part of the gas free vacuum envelope of the device; thus the amount of the deformation of the cavity is severely limited by the necessity of maintaining a vacuum. Specifically, attempts at mechanical tuning have included such principles as the use of movable tuning slugs or an attached bellows arrangement by which the mechanical deformation could be accomplished. These methods permitted small increases in the tuning range, but produced the additional problems with regard to maintaining the vacuum seal as the dimensions were varied.

Later attempts to provide an acceptable tuning method of the cavities employed magnetic ferrite materials, which are placed within the cavity to deform the magnetic fields therein thus producing a change in the electromagnetic dimensions of the cavity. These magnetic elements could be mechanically inserted into the cavity or varied in their position with relation to direction of the fields therein to produce a change of resonant frequency. Also, the magnetic saturation of the ferrite could be varied to produce the desired result. Additional attempts have been made to use dielectrics in much the same way as the magnetic elements. However, the placing of these elements within the cavity itself causes non-uniform deformation of the fields therein which will tend to produce unwanted modes of operation.

Coupling of the primary cavity to another cavity of different resonant frequency external thereto is another method employed to vary the resonant frequency of a cavity. The exteriorly disposed cavity, however, provided only a limited range of tuning besides presenting certain gas leakage difficulties and in some cases the production of undesired modes of operation.

The additional method of electronic tuning could be employed to vary the frequency of a reflex klystron. In electronic tuning, the frequency control is achieved by means of variations in the reflector electrode voltage. This method is effective but is limited to approximately one percent of the center frequency.

Accordingly, it is an object of the present invention to provide an apparatus for tuning a resonant cavity over a relatively wide band of frequencies.

It is another object of this invention to provide a resonant cavity including a means to sweep a relatively wide band of frequencies in a relatively short time interval.

A further object of this invention is to provide the cavity of a reflex klystron or other klystron with an external tuning means by which the frequency of operation may be varied in accordance with an externally applied voltage.

Various other objects and advantages will appear from the following description of several embodiments of the invention, and the most novel features will be particularly pointed out hereinafter in connection with the appended claims.

Figure 1:
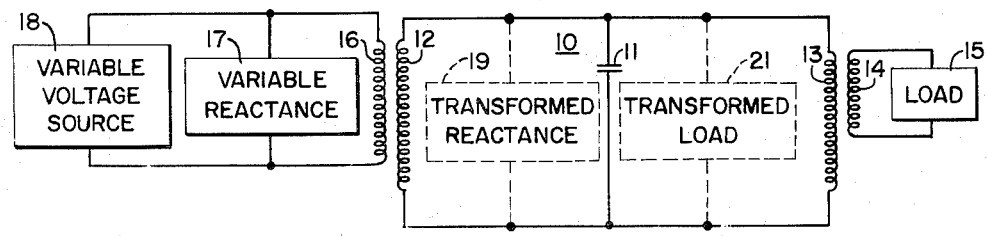
FIG. 1 illustrates the equivalent circuit of the elements of the invention.

In FIG. 1, the resonant circuit 10 of the cavity resonator may be represented by a capacitance 11 and a pair of inductive elements 12 and 13. This circuit represents in familiar tank circuit form, the action of a resonant cavity. The oscillating energy in the cavity circuit 10 is transferred to a load 15 external of the cavity through the mutual inductance existing by coupling between the inductive element 13 and a magnetic coupling element 14. In this manner the high frequency energy in the cavity is extracted therefrom for useful purposes.

Coupled to the other inductive element 12 of the resonator 10 is a variable reactance 17. This variable reactance 17 has a reactive value which is a function of the voltage applied thereto, as will be later explained, from a voltage source 18. Although the coupling between the resonator 10 and both the load 15 and the variable reactance 17 have in this case been shown in simplified form as inductive couplings, it is apparent that coupling can equally well be of the capacitive or electrostatic type. The effect of the coupling of the variable reactance 17 to the resonator circuit 10 is to produce an equivalent resonator circuit which includes the value of the transformed reactance 19 in parallel with the reactances of the cavity; this is effective to either raise or lower the resonant frequency of the combined circuit depending on the reactive value of the transformed reactance. By changing the reactance value of the variable reactance 17, the value of the transformed reactance 19 in the equivalent circuit is changed, as is the resulting frequency of resonance of the combined oscillatory circuit.

Semiconductor diodes of both the junction and the point contact variety consisting of such materials as germanium, gallium arsenide, or silicon provide an effective voltage dependent capacitance when biased in the reverse direction. This phenomena is caused by a property known as barrier or depletion capacitance. A reverse bias voltage causes a depletion of the carriers in and around the junction or point contact thereby creating a barrier to conduction. An increase of the reverse bias simply causes this barrier to effectively extend through a greater distance on each side of the junction. The magnitude of the barrier capacitance will vary according to the inverse of the square root of the increase in the amplitude of the reverse bias voltage. The subject of barrier or depletion capacitance is discussed in more detail in the book entitled, "Semiconductor Devices," by John N. Shive, Published by the D. Van Nostrand, Inc. of Princeton, New Jersey in 1959.

Figure 2:
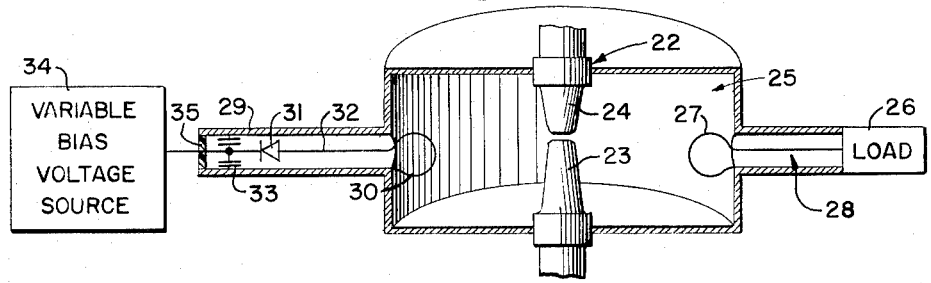
FIG. 2 is a pictorial representation of a portion of a reflex klystron tube including the resonant cavity and a tuning arrangement acording to the present invention with the element magnetically coupled to the cavity.

In FIG. 2, the accelerator electrodes of a reflux klystron of the type which is designated in the art as the 6–BL–6, is composed of assemblies 23 and 24 with a gap therebetween. High frequency oscillations are maintained at the gap by a resonator cavity 25, which is coupled to the electron flow through the gap, in a manner which is well known in the art. The details of the operation of the reflex klystron 22 will not be discussed since they do not form a part of this invention and adequate reference material is available on the subject. It will suffice to say that the energy of the electron flow between the accelerator gap is transferred to maintain and amplify the oscillation within the resonant cavity 25.

The cavity 25 is essentially annular in shape and in the principal mode of operation has an oscillating electromagnetic field in which the magnetic field component is circumferential and the electrostatic field extends from the top to the bottom of the cavity as shown. A load 26 is coupled by means of the coupling loop 27 and coaxial section 28 to the magnetic field in the cavity, in the well known fashion. An additional coaxial section 29 containing semiconductor diode 31 is physically attached to the curved wall of the cavity. The diode 31 is connected in series between portions of the center conductor 32 of the coaxial section 29. A pair of capacitors 33, or other suitable radio frequency bypass means, are connected between the center conductor and the outside walls of the coax to form a short circuit termination for the high frequency energy at that point. An external bias voltage source 34 applies a positive voltage through the center conductor 32 to the cathode of the semiconductor rectifier 31. The positive voltage of the source 34 may be variable according to certain predetermined functions so that the reverse bias on the semiconductor rectifier 31 may be regulated accordingly to produce the desired values of barrier capacitance. The anode of the rectifier 31 is connected to the other portion of the center conductor of the coaxial section 29, which terminates in a coupling loop 30 extending into the resonator cavity. The loop 30 couples the additional coaxial section 29 to the magnetic field within the cavity in the same manner that the load 26 is coupled.

The effective impedance of the coaxial section 29 is in part determined by the effective length of the coaxial section 29 which in turn depends on spacing of the capacitor bypass elements 33 and of the semiconductor rectifier 31. The spacings are determined according to known microwave principles to give a desired impedance match to the entire section for a certain set value of reverse bias voltage from source 34. Once the spacings have thus been fixed, it should be evident that a change in the amplitude of the bias voltage from source 34 will change the reactance of the semiconductor rectifier 31 in accordance with the before-mentioned principles and thereby change the total impedance of the entire section which is coupled to the resonator cavity.

Therefore, the frequency at which the cavity resonator of the reflex klystron 22 will oscillate will depend upon the combined reactance of the resonator cavity and the added coaxial section 29 with the variable reactance 31 therein. Thus it may be seen that the resonant frequency of the combination is variable by simply varying the amplitude of the bias voltage applied from the source 34. Since the bias voltage source 34 can be connected to the rectifier 31 preferably through an airtight closure plug 35 of non-metallic material or any other suitable arrangement to maintain the gas tight integrity of the cavity system, the gas leak disadvantages of the mechanical tuning systems are thereby obviated.

The response time of most semiconductor rectifiers to a change in the bias voltage in the reverse direction is very rapid in comparison with prior methods of varying microwave reactances. Thus, by using a modified sawtooth wave as a bias voltage from the source 34, the rectifier 31 may be made to sweep the entire range of reactance values in a comparatively short time. With present junction type semiconductor reactifiers now available, a frequency sweep in excess of five percent of the nominal center frequency of a reflex klystron has been accomplished at rates of tuning in excess of one megacycle per second.

Figure 3:
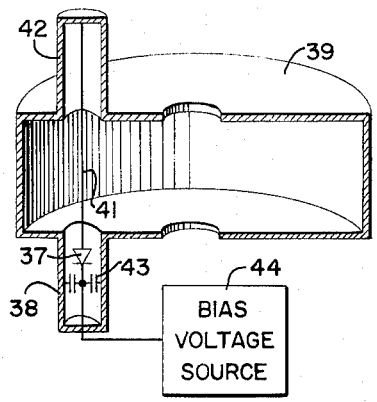
FIG. 3 is a representation of a resonant cavity including the tuning element of FIG. 2 with an alternative method of magnetic coupling.

In FIG. 3, the semiconductor rectifier 37 within an additional coaxial tuning section 38 is coupled to an annular resonator cavity 39 by another method. In this case, the coaxial section 38 containing the variable reactance in the form of the semiconductor rectifier 37 is attached to the bottom of the cavity 39, as illustrated, so that it is parallel to the axis of the annular cavity. The center conductor 41 is extended from the bottom of the cavity 39 through the top portion and into a recessed tubular portion 42 located at the top thereof to form anothed short coaxial section. In this manner a dual coupling with the electromagnetic field within the cavity 39 is attained. The conductor 41 extending vertically into the cavity 39 is aligned with the electrostatic field within the cavity. Also the conductor 41 comprises a portion of a magnetic loop which is formed by the conductor and the cavity top, side and bottom adjacent thereto. The conductor 41 must be conductively attached to the end of the section 42 to provide a directcurrent return path for the semiconductor rectifier 37. The length of the additional coaxial section 42 is designed to place the desired reactance in series with the reactance of the coupling loop for impedance matching purposes. This embodiment also contains bypass capacitors 43 connected to the coaxial conductors and a bias voltage source 44 which operate in the same manner as previously described in connection with the embodiment of FIG. 2.

Figure 4:
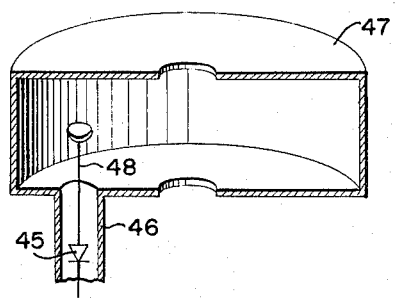
FIG. 4 is a pictorial representation of the electrostatic coupling of the tuning element to the resonant cavity.

In FIG. 4, a semiconductor diode 45 is contained within a vertical coaxial section 46 which is paralled to and radially disposed from the axis of the annular cavity resonator 47. The center coaxial conductor 48 in this case extends into the cavity only about half way to act as a probe for electrostatic coupling in the well known manner of the field within the resonator. Of course, a D.C. return must again be provided but in this case between the cavity exterior and semiconductor diode. As before, the parameters employed in this mode of coupling may be varied according to the well known principles to obtain correct impedance matching.

Figure 5:
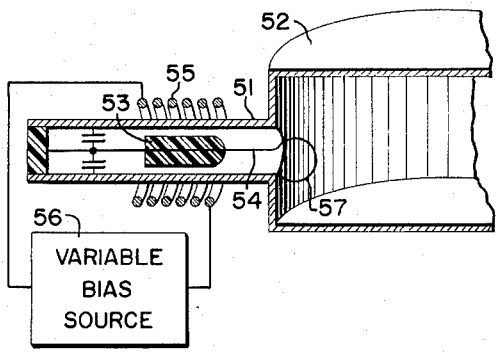
FIG. 5 is a pictorial representation of a portion of a resonant cavity with a magnetic tuning element according to the present invention, which is magnetically coupled to the cavity.

In the embodiment shown in FIG. 5, an external section of coaxial transmission line 51 extends radially from the resonant cavity 52 of which only a portion is shown. In this embodiment, the variable reactance employed is a ferrite plug 53 supported within the coaxial section 51 and surrounding the center conductor 54 thereof. The ferrite plug 53 may be of any nonconducting ferromagnetic material; for example, it may comprise iron oxide with some of the oxides of one or more metals such as nickel, magnesium, zinc, manganese, and aluminum, combined in a spinel crystal structure. A solenoid coil 55 is mounted on the coaxial transmission line around the section containing the ferrite plug 53 and is connected to a variable current bias source 56. When a sufficient current is passed to the external coil 55 from the bias source 56, a magnetic field of a given strength is produced within the transmission line section and reacts upon the ferrite plug 53 to change the magnetization thereof. The change in the magnetization of the plug 53 also changes the impedance of the external coaxial section 51.

The impedance of the section of coaxial cable 51 is coupled to the magnetic field of the resonator cavity 52 by means of the loop 57. The change in the impedance of the coaxial section is thus coupled to the reactance of the resonator cavity 52 to produce a combined reactance, which is responsive to the change in current from the bias source 56. Thus the reactance of the combination determines the frequency at which oscillations will occur within the resonator cavity.

In accordance with the invention, various arrangements have been shown for coupling an external voltage variable impedance to a resonator cavity so that the resonant frequency of oscillations therein may be controlled and varied according to the magnitude of a bias voltage from a variable source. This arrangement allows frequency sweeps over a fairly wide range of microwave frequencies to be accomplished for the resonator cavity of reflex klystrons or other similar microwave devices.

It will be understood that various changes in the details, materials, and elements, which have been herein described and illustrated in order to explain the nature of the invention, may be made by those skilled in the art, within the principle and scope of the invention as expressed in the appended claims.

What is claimed is:

1. In combination with a high frequency electron discharge tube which includes a cavity resonator, an apparatus for adjusting the resonant frequency of said resonator comprising, voltage dependent reactance means external to said cavity, means including probe means projecting into the cavity of said cavity resonator and connected to said reactance means for conducting electromagnetic energy between said reactance means and said cavity resonator, a variable voltage source connected to said reactance means for varying the reactance thereof, the magnitude of said reactance means varying in relation to the voltage applied from said source, whereby a change in the reactance of said reactance means changes the resonant frequency of said resonator, said voltage dependent reactance means comprising a section of microwave coaxial cable having an inner conductor and an outer conductor, a semiconductor rectifier having a barrier capacitance whose magnitude depends upon the amplitude of the reverse bias applied thereto, said variable voltage source being connected to said semiconductor rectifier to apply a voltage in a reverse direction, said semiconductor rectifier being connected in series between two portions of said center conductor of said coaxial cable section, capacitor means connected between said inner conductor and said outer conductor at a point between said variable voltage source and said semiconductor rectifier whereby the total reactance of said coaxial cable section is varied by changing the amplitude of the applied voltage in the reverse direction to said semiconductor rectifier.

2. In combination with a high frequency electron discharge tube which includes a cavity resonator, an apparatus for adjusting the resonant frequency of said resonator comprising, voltage dependent reactance means external to said cavity, means including probe means projecting into the cavity of said cavity resonator and connected to said reactance means for conducting electromagnetic energy between said reactance means and said cavity resonator, a variable voltage source connected to said reactance means for varying the reactance thereof, the magnitude of said reactance means varying in relation to the voltage applied from said source, whereby a change in the reactance of said reactance means changes the resonant frequency of said resonator, said voltage dependent reactance comprising a coaxial line section, a ferrite material disposed within said coaxial section, and means for applying a variable magnetic field to said ferrite, whereby the reactance of said coaxial section is a function of the magnitude of said magnetic field.

3. Apparatus for varying the resonant frequency of a cavity resonator comprising semiconductor rectifier means, a bias voltage source, first coaxial cable means connecting said bias voltage source to said semiconductor rectifier for applying a variable reverse bias thereto, capacitor means connected between the inner conductor and the outer conductor of said first coaxial cable means, second coaxial cable probe means connected to said semiconductor resonator and extending into the cavity of said cavity resonator for coupling said semiconductor rectifier to said cavity resonator, the reactance of said semiconductor rectifier being a function of said reverse bias voltage, whereby a variation in the reactance of said semiconductor rectifier changes the resonant frequency of said cavity resonator.

4. Tuning apparatus for a microwave cavity resonator comprising variable reactance means, a coaxial cable, said coaxial cable having an inner conductor, probe means connected to said inner conductor and projecting into the cavity of said cavity resonator, a variable voltage source, variable reactance means connected to the inner conductor of said coaxial cable, said variable voltage source being coupled to said variable reactance means, said variable reactance means having a reactance dependent upon the voltage applied thereto, capacitor means connected between the inner and outer conductor of said coaxial cable said variable reactance means being a ferrite material surrounding the center conductor of said coaxial cable and said variable voltage source being connected to a coil surrounding the outer conductor of said coaxial cable whereby the reactance of said ferrite may be varied.

References Cited by the Examiner

UNITED STATES PATENTS

| 2,906,974 | 9/59 | Reggia | 333—24.1 |
| 3,039,064 | 6/62 | Dain et al. | 333—83 |
| 3,064,210 | 11/62 | Steele et al. | 332—52 |
| 3,085,205 | 4/63 | Sante | 333—83 |

OTHER REFERENCES

Southworth, G. C., Principles and Applications of Waveguide Transmission N.Y., D. Van Nostrand Co., 1950, pages 208 and 284.

ELI LIEBERMAN, *Acting Primary Examiner.*

HERMAN K. SAALBACH, *Examiner.*